US006889897B2

(12) United States Patent
Nomiyama et al.

(10) Patent No.: US 6,889,897 B2
(45) Date of Patent: May 10, 2005

(54) BILL RECEIVING/PAYING DEVICE AND AUTOMATED CASH TRANSACTION APPARATUS

(75) Inventors: Akira Nomiyama, Kashiwa (JP); Shigeru Sasaki, Tomobe (JP); Shinji Shibata, Nagoya (JP)

(73) Assignee: Hitachi, Ltd., Tokyo (JP)

(*) Notice: Subject to any disclaimer, the term of this patent is extended or adjusted under 35 U.S.C. 154(b) by 21 days.

(21) Appl. No.: 10/279,929

(22) Filed: Oct. 25, 2002

(65) Prior Publication Data

US 2003/0127509 A1 Jul. 10, 2003

(30) Foreign Application Priority Data

Jan. 7, 2002 (JP) ....................................... 2002-000229

(51) Int. Cl.$^{7}$ ................................................ G06F 17/60
(52) U.S. Cl. ........................................... 235/379; 902/8
(58) Field of Search ................................ 235/379, 385, 235/470; 902/7, 8, 14

(56) References Cited

U.S. PATENT DOCUMENTS 4,616,817 A 10/1986 Yamauchi et al.
4,707,843 A 11/1987 McDonald et al.
4,830,742 A * 5/1989 Takesako .................... 209/534
5,975,525 A 11/1999 Hartmann et al.
6,270,010 B1 * 8/2001 Junkins et al. .............. 235/379
6,621,919 B2 * 9/2003 Mennie et al. .............. 382/135

FOREIGN PATENT DOCUMENTS

| | | |
|---|---|---|
| EP | 0 967 581 A2 | 12/1999 |
| EP | 1 160 737 A1 | 12/2001 |
| WO | WO 00/24662 | 5/2000 |
| WO | WO 01/70610 A1 | 9/2001 |

* cited by examiner

*Primary Examiner*—Daniel St. Cyr
(74) *Attorney, Agent, or Firm*—Antonelli, Terry, Stout & Kraus, LLP

(57) ABSTRACT

A bill receiving/paying device and an automated cash transaction apparatus, by which bills of different sizes are dealt and by which charging and recovery can be made together, are provided. A charging/recovery box capable of storing and discharging the bills of different sizes in an intermixed state are provided in the bill receiving/paying device to solve the problems involved in the prior art. For example, in the case of charging, the bills of different sizes stored in the charging/recovery box in the intermixed state are paid out onto a conveyance path to go thorough a bill discrimination portion so as to be discriminated thereby with respect to kinds thereof to be stored in the storage/discharge boxes every kind of bills, so that the bills packed in the charging/recovery box can be charged together in the bill receiving/paying device.

15 Claims, 17 Drawing Sheets

PUTTING BILL RECEIVING/ PAYING DEVICE 1 IN CHARGING MODE

↓

DISCHARGING BILLS STORED IN CHARGING/ RECOVERY BOX 8

↓

DISCRIMINATING KIND AND STATE OF BILL IN BILL DISCRIMINATION PORTION 3

↓

STORING BILLS IN RESPECTIVE BILL UNITS ACCORDING TO KIND AND STATE OF BILL

BILL RECEIVING/PAYING DEVICE AND AUTOMATED CASH TRANSACTION APPARATUS

BACKGROUND OF THE INVENTION

The invention relates to a bill receiving/paying device and an automated cash transaction apparatus, which reuse a received bill as a bill for payment.

A bill receiving/paying device mounted in an automated cash transaction apparatus used for a financial institution is provided with a storage/discharge box, which serves to store a received bill and discharge the same as a bill for payment at the time of payment, in other words, recycles a bill.

Hereupon, in the case of handling domestic and foreign bills, bills to be handled are increased in kind, which makes it necessary to handle bills widely different in size and rigidity. JP-A-2000-187752 discloses a bill receiving/paying device provided with a storage/discharge box, in which a roof plate is vertically adjustable in accordance with the length of a bill to be stored in a short side direction of the bill in order to handle the bills different in size. Also, JP-A-7-257805 discloses a sheet-like item stacking device provided with a stacking guide plate of which position is adjusted in accordance with a bill size in order to store sheet-like items different in size.

BRIEF SUMMARY OF THE INVENTION

The bill receiving/paying device described in JP-A-2000-187752 can not store bills of different sizes in a storage/discharge box in an intermixed state. For example, in the case that the roof plate is adjusted into a position for handling a bill of small size, if it is tried to store a bill of large size, a leading end of the bill in a running direction collides against the roof plate and thus, it is not possible to ensure a sufficient storage space. Meanwhile, in the case that the roof plate is adjusted so as to handle a bill of large size, if it is tried to store a bill of small size, a distance between a position in which the bill is interposed between rollers and a position in which a leading end of the bill in the running direction collides against the roof plate becomes long, so that it is difficult to store the bill in a storage/discharge box in an aligned state. For example, in the case of Eurocurrency, a minimum Euro bill has a long side of 120 mm and a short side of 60 mm while a maximum Euro bill has a long side of 170 mm and a short side of 85 mm. Thus, it is not possible that the same storage/discharge unit stores the bills having a large difference in size, in an intermixed state.

Hereupon, in the case of charging bills in an automated cash transaction apparatus, the bills to be charged are, firstly, charged in one charging/recovery box, and thereafter passed thorough a discriminating portion in which the number of bills is decided, to charge those in bill storage units by kinds. Also, in the case of withdrawing the bills, an empty charging/recovery box is mounted, and the bills are conveyed from the storage/discharge units by kinds thorough the discriminating portion in which the number of bills is decided, to be stored in the charging/recovery box.

As described above, in order to charge or withdraw the bills, it is necessary to intermix bills of plural kinds in one charging/recovery box, while the device disclosed in JP-A-2000-187752 cannot charge and withdraw the bills in a lump in the case that the bills has greatly different sizes every kind. Also, in making detailed check during operation, it is necessary to make motions of withdrawing and charging and thus, the detailed check cannot be made in the prior configurations.

The invention has been thought of in view of the above problems, and the object thereof is to provide a bill receiving/paying device and an automated cash transaction apparatus, which can deal bills of different sizes, and charge and withdraw those in a lump.

In order to achieve the object, according to a first feature of the invention, a bill receiving/paying device includes: a bill storage unit for storing and discharging a bill; a bill size detecting means for detecting a size of the bill to be stored in the bill storage unit; a bill passage sensor for detecting passage of the bill to be conveyed to the bill storage unit; and a control portion for controlling the respective constituents, wherein the bill storage unit includes a stacking assist means for restraining excessive moving of the bill entering into the bill storage unit, and the control portion controls the stacking assist means on the basis of information with respect to a size of the bill, which information is detected by the bill size detecting means after the passage of the bill has been detected by the bill passage sensor.

According to a second feature of the invention, there is provided the bill receiving/paying device having the above first feature, wherein the bill size detecting means includes a bill discriminating unit for discriminating a kind of the bill, and a storage portion having a database in which kinds of the bills and sizes of the bills are associated with each other.

According to a third feature of the invention, there is provided the bill receiving/paying device having the above first feature, wherein the bill storage unit stores the bill so as to be in an upright posture.

According to a fourth feature of the invention, there is provided the bill receiving/paying device having the above first feature, wherein the control portion controls the stacking assist means in such a manner that, when discharging the bill, the stacking assist means escapes to a position in which the stacking assist means does not to interfere with the bill to be discharged.

According to a fifth feature of the invention, there is provided the bill receiving/paying device having the above first feature, wherein there are the plurality of bill storage units, the bill storage units being charging/recovery boxes used for withdrawing a bill from other bill storage units and for charging the other bill storage units with a bill.

According to a sixth feature of the invention, there is provided the bill receiving/paying device having the above fifth feature wherein, there are the plurality of bill storage units, the bill storage units include a receipt box for storing a bill being not suited to payment, storage/discharge boxes for storing and discharging bills by kinds, and a charging/recovery box for withdrawing the bill from the storage/discharge boxes and charging the storage/discharge boxes with a bill, and wherein the bill receiving/paying device further includes a bill discrimination portion for discriminating a kind of the bill, and a conveyance path by which the respective bill storage units and the bill discrimination portion are connected to each other, and along which a bill are conveyed, the conveyance path arranging the bill discrimination portion on a path portion connecting between the charging/recovery box and the storage/discharge boxes.

According to a seventh feature of the invention, there are provided the bill receiving/paying device having the above first feature wherein, the bill storage unit includes a roller for feeding a bill, the roller constituting a receiving/paying opening, and stacking guide having a bill guide surface for guiding the bill fed to the bill storage unit in a moving direction; the stacking assist means includes a stacking assist member having a bill end stopper portion which restrains a leading end of the bill to be stored in a moving direction, and forming a taking-in space; and the control portion controls a distance of the bill end stopper portion from the receiving/paying opening.

According to an eighth feature of the invention, there is provided the bill receiving/paying device having the above seventh feature, wherein the stacking assist member includes a roller portion having a rotation axis along an edge line of a leading end in the moving direction of the bill, a vane portion protruding radially from the roller portion, and a movable tip end portion connected to a tip end of the vane portion so as to be able to turn within a predetermined angle; and the vane portion has a tip end curved toward the receiving/paying opening, which tip end is in a L-shaped configuration.

According to a ninth feature of the invention, there is provided the bill receiving/paying device having the above eighth feature, wherein the stacking assist member is provided in plural in a direction along a rotation axis the roller portion.

According to a tenth feature of the invention, there is provided a bill receiving/paying device including: a bill storage unit for horizontally stacking bills in an upright position; a conveying device for conveying the bills to the bill storage unit; a partition member positioned in a manner to partition an interior of the bill storage unit into a taking-in space and a storage portion when a bill conveyed by the conveying device is taken into the bill storage unit, and moved in a manner to allow the bill to be conveyed when the bill taken into the bill storage unit is conveyed to the storage portion; and a restraining member adapted to be displaced in accordance with a size of the bill taken in, so as to come into contact with a leading end of the bill to restrain the bill from moving when the bill is taken into the bill storage unit, wherein the storage portion enables bills of different sizes to be stored therein.

According to an eleventh feature of the invention, there is provided the bill receiving/paying device having the above tenth feature, wherein the partition member and the restraining member are formed integrally.

Also, an automated cash transaction apparatus according to the invention may be provided with the bill receiving/paying device having at least one of the above features.

Other objects, features and advantages of the invention will become apparent from the following description of the embodiments of the invention taken in conjunction with the accompanying drawings.

DETAILED DESCRIPTION OF THE INVENTION

An explanation will be given below to an embodiment of the invention.

Figure 1:
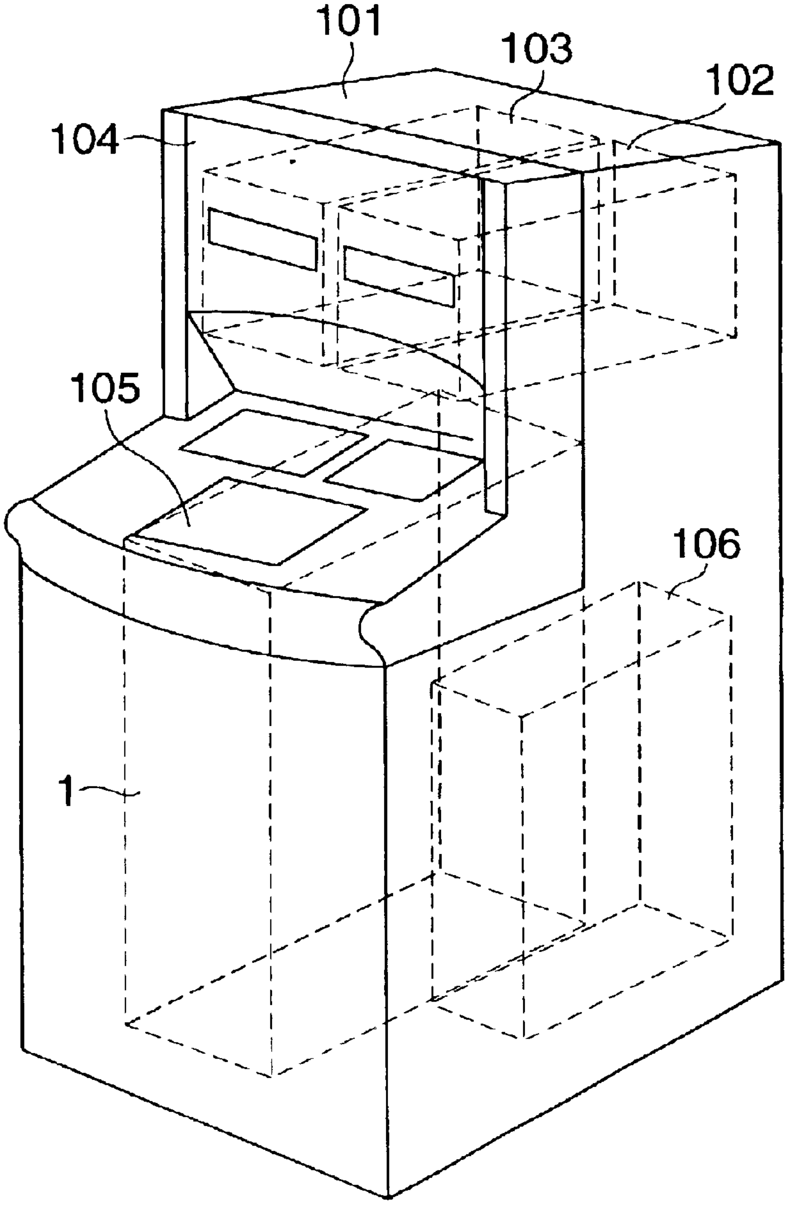
FIG. 1 is a view showing an outward appearance of an automated cash transaction apparatus, to which the invention is applied.

FIG. 1 is a view showing an outward appearance of an automated cash transaction apparatus, to which the invention is applied. The automated cash transaction apparatus 101 according to the present embodiment includes a card/statement processing mechanism 102 for processing a transaction card of a customer and a transaction statement paper, a bankbook processing mechanism 103 for dealing a bankbook, a housing 104, and a customer operating portion 105 for displaying and inputting information required for transaction. In the housing 104, there is provided a bill receiving/paying device 1.

Figure 2:
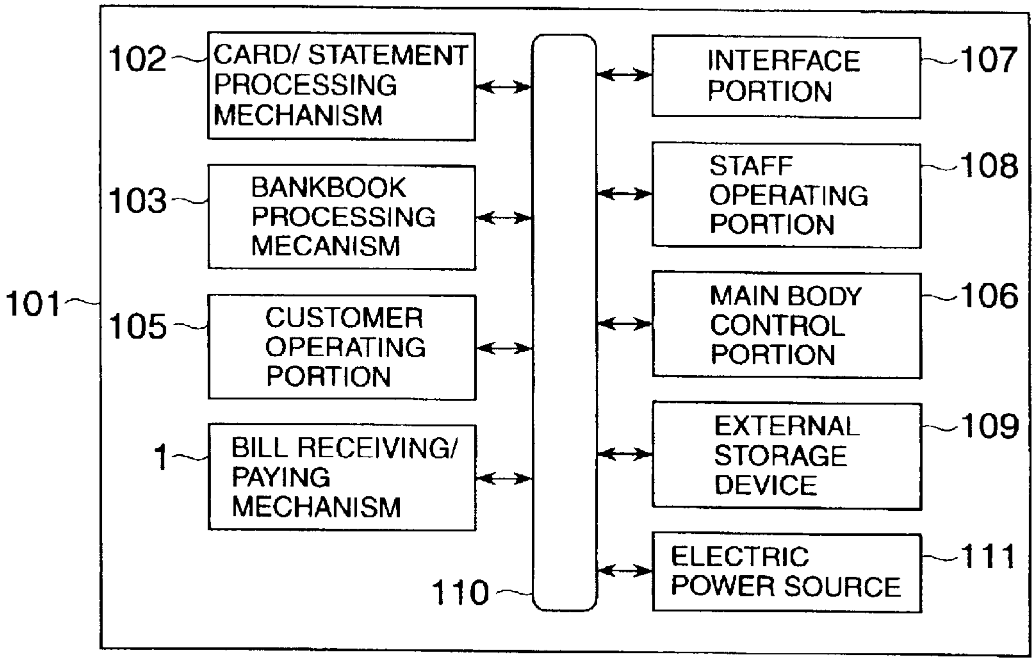
FIG. 2 is a view showing a control mechanism of the automated cash transaction apparatus, to which the invention is applied.

FIG. 2 is a block diagram showing control relationship in the present apparatus. The card/statement processing mechanism 102, the bankbook processing mechanism 103, the customer operating portion 105 and the bill receiving/paying device 1 are connected to a main body control portion 106 via a bus 110 to perform necessary actions under control of the main body control portion 106. In addition, the above elements are also connected to an interface portion 107, a staff operating portion 108, and an external storage device 109 via the bus 110 to give and take data as required, while detailed description thereof is omitted here. The respective mechanisms and constituents are supplied with electric power from an electric power source 111.

Figure 3:
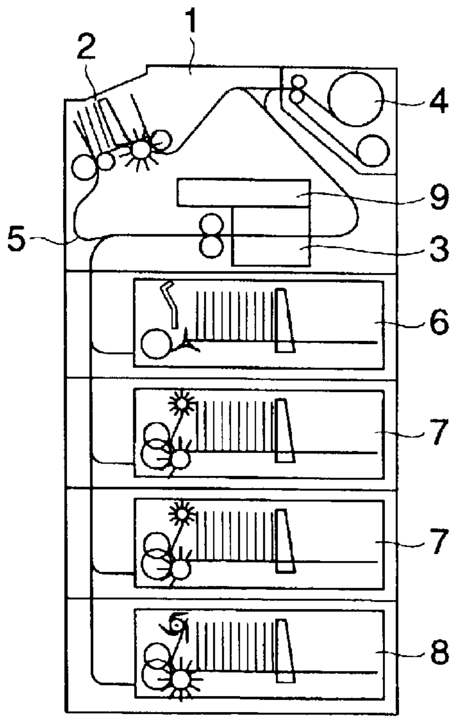
FIG. 3 is a view showing a configuration of a bill receiving/paying device.
Figure 4:
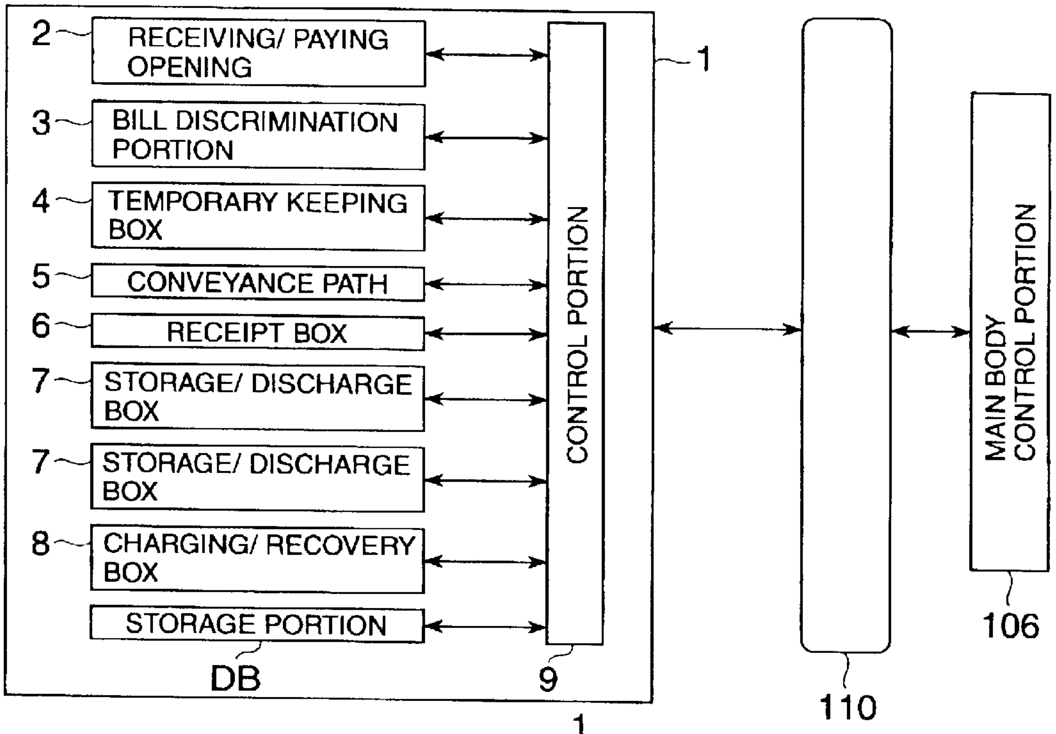
FIG. 4 is a view showing a control mechanism of the bill receiving/paying device according to an embodiment.

FIG. 3 is a view showing a configuration of the bill receiving/paying device 1 loaded on the automated cash transaction apparatus 101, and FIG. 4 is a view showing a control mechanism. The bill receiving/paying device 1 includes a receiving/paying opening 2 through which a bill is received or withdrawn, a bill discrimination portion 3 for discriminating the kind and the truth of the bill, a temporary keeping portion 4 for temporarily storing a received bill until the transaction is concluded, a conveyance path 5 by which the respective constituents of the bill receiving/paying device 1 are connected and along which the bill is conveyed, and bill storage units for storing a bill to be dealt in the bill receiving/paying device 1.

The bill storage units are classified according to roles assigned, and include, for example, a receipt box for storing a rejected bill which has been decided to partly cause a fold, a storage/discharge box serving as a bill storage unit by kinds of the bills, which storage unit receives and discharges a bill every kind in receipt and payment of the bill, and a charging/recovery box for charging the storage/discharge box with bills and withdrawing bills from the storage/discharge box.

According to the present embodiment, the receipt box 6 is provided in a topmost stage as shown in FIG. 3. Among bills as received, a bill which has been decided not to be appropriate for payment due to a fold or the like is stored in the receipt box 6. The storage/discharge boxes 7 are provided in second and third stages. Bills are stored by kinds in the storage/discharge boxes 7, and the bills as stored are discharged at the time of payment. For example, the box in the second stage can be made as a box assigned to a bill of 1,000 yen and the box in the third stage can be made as a box assigned to a bill of 10,000 yen. The charging/recovery box 8 is provided in a fourth stage. Since the charging/recovery box 8 is provided for charge and recovery, it must be a bill storage unit capable of storing and discharging bills of plural kinds to be dealt by the bill receiving/paying device 1, in an intermixed state.

Further, the bill receiving/paying device 1 includes a storage portion DB for memorizing the correspondence between kinds of bills and sizes thereof. By providing the storage portion DB, it is possible to discriminate the sizes of the bills from one another by means of discrimination of the kinds of bills from one another. A control portion 9 is connected to the main body control portion 106 through the bus 110 to control the bill receiving/paying device 1 in accordance with a command from the main body control portion 106 and a detected state of the bill receiving/paying device 1, and to transmit a state of the bill receiving/paying device 1 to the main body control portion at need.

Charging of the bills in the embodiment will be described below with reference to FIGS. 5 to 7. Charging of bills is made, for example, in the case that the bills are charged before the automated cash transaction apparatus 101 is put into operation, or in the case that the device is to be replenished with the bills when the bills which have been charged become small in number during operation. The control portion 9 is put into a charging mode to control the respective constituents so as to make charging of the bills in the following manner.

Figure 5:
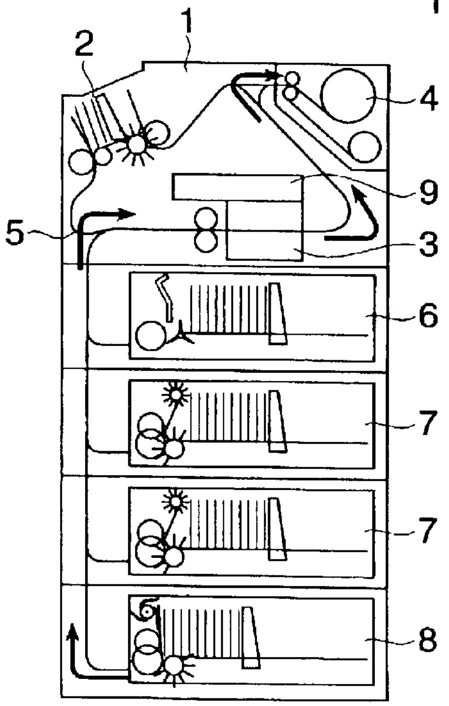
FIG. 5 is a view showing operation of the embodiment when charging bills.

As shown in FIG. 5, the bills stored in the charging/recovery box 8 are paid out onto the conveyance path 5. The bills paid out onto the conveyance path 5 are conveyed in a direction indicated by arrows in the figure and go through the bill discrimination portion 3 to be decided with respect to kinds and number of the bills to be temporarily kept in the temporary keeping portion 4.

Figure 6:
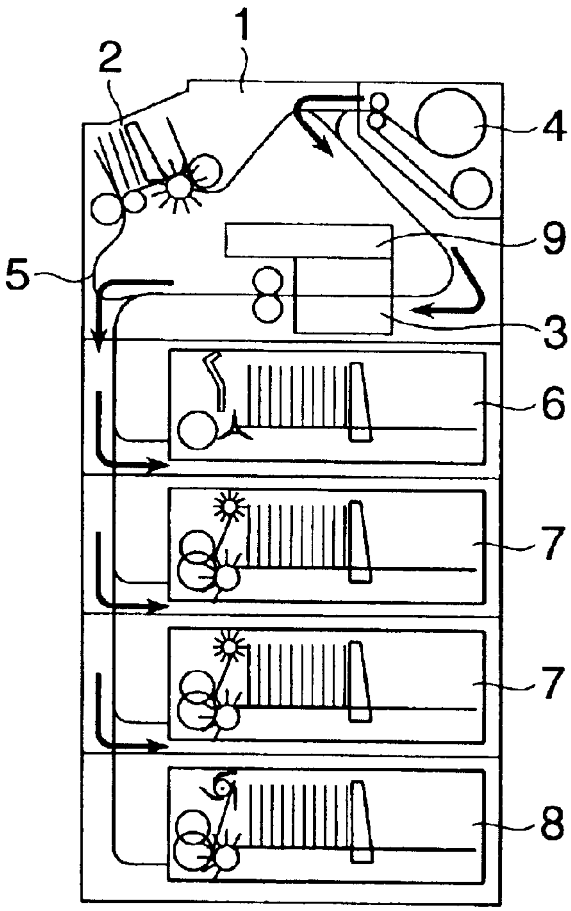
FIG. 6 is a view showing operation of the embodiment when charging bills.
Figure 7:
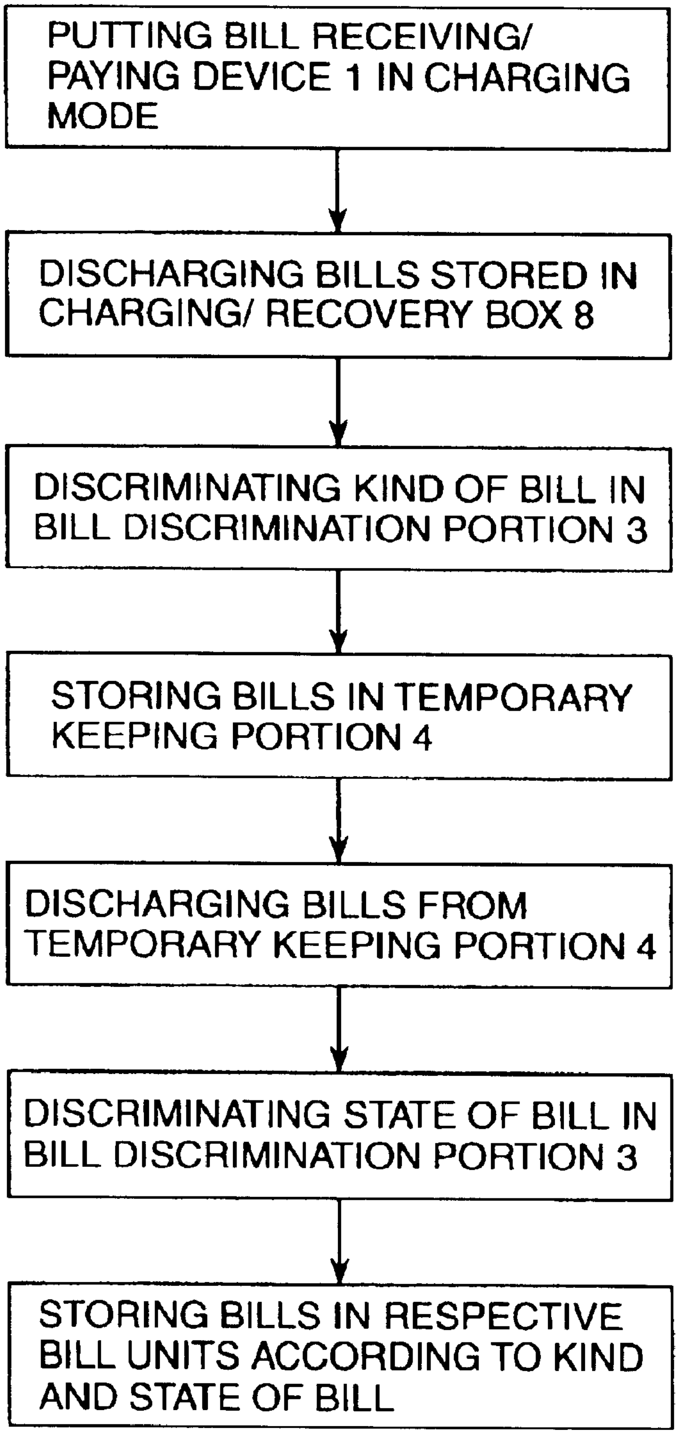
FIG. 7 is a view showing a flowchart of the embodiment when charging bills.

Subsequently, the bills kept in the temporary keeping portion 4 are conveyed in a direction indicated by arrows as shown in FIG. 6 and discriminated by the bill discrimination portion 3 with respect to states of the bills, and when the bills are rejected ones, they are stored in the receipt box 6. The bills discriminated as being not rejected ones are stored in the storage/discharge boxes 7 every kind. FIG. 7 shows a flowchart of the above charging of the bills.

Subsequently, recovery of bills in the embodiment will be described with reference to FIGS. 8 to 10. The recovery of the bills is made in the case that the bills in the automated cash transaction apparatus 101 are withdrawn, for example, after the closing of business, or in the case that the bills which have been charged during operation become large in number, so that the need of withdrawing the bills in the apparatus arises. The control portion 9 is put into a recovery mode to control the respective constituents so as to make recovery of the bills in the following manner.

Figure 8:
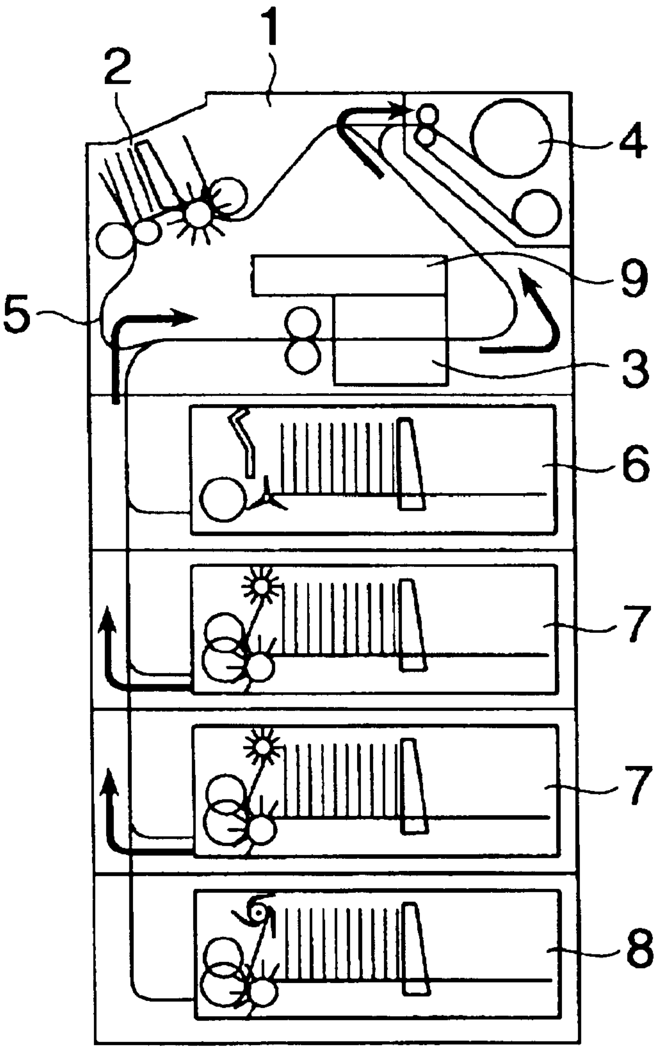
FIG. 8 is a view showing the operation of the embodiment when withdrawing bills.

As shown in FIG. 8, the bills stored in the storage/discharge boxes 7 are fed out onto the conveyance path 5. The bills fed out onto the conveyance path 5 are conveyed in a direction indicated by arrows in the figure and go thorough the bill discrimination portion 3 to be decided thereby with respect to the kinds and the number of the bills, so that the bills are temporarily kept in the temporary keeping portion 4.

Figure 9:
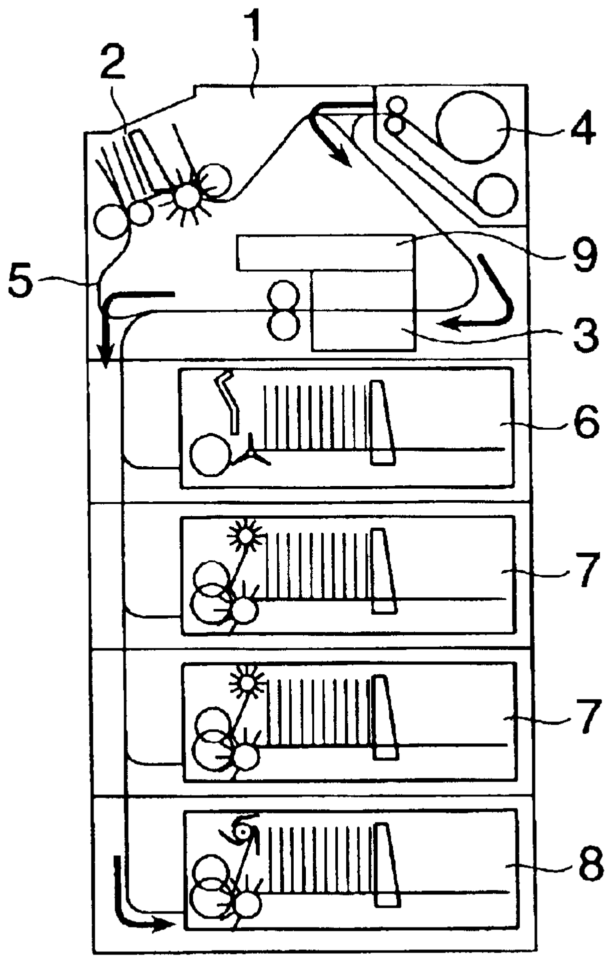
FIG. 9 is a view showing operation of the embodiment when withdrawing bills.
Figure 10:
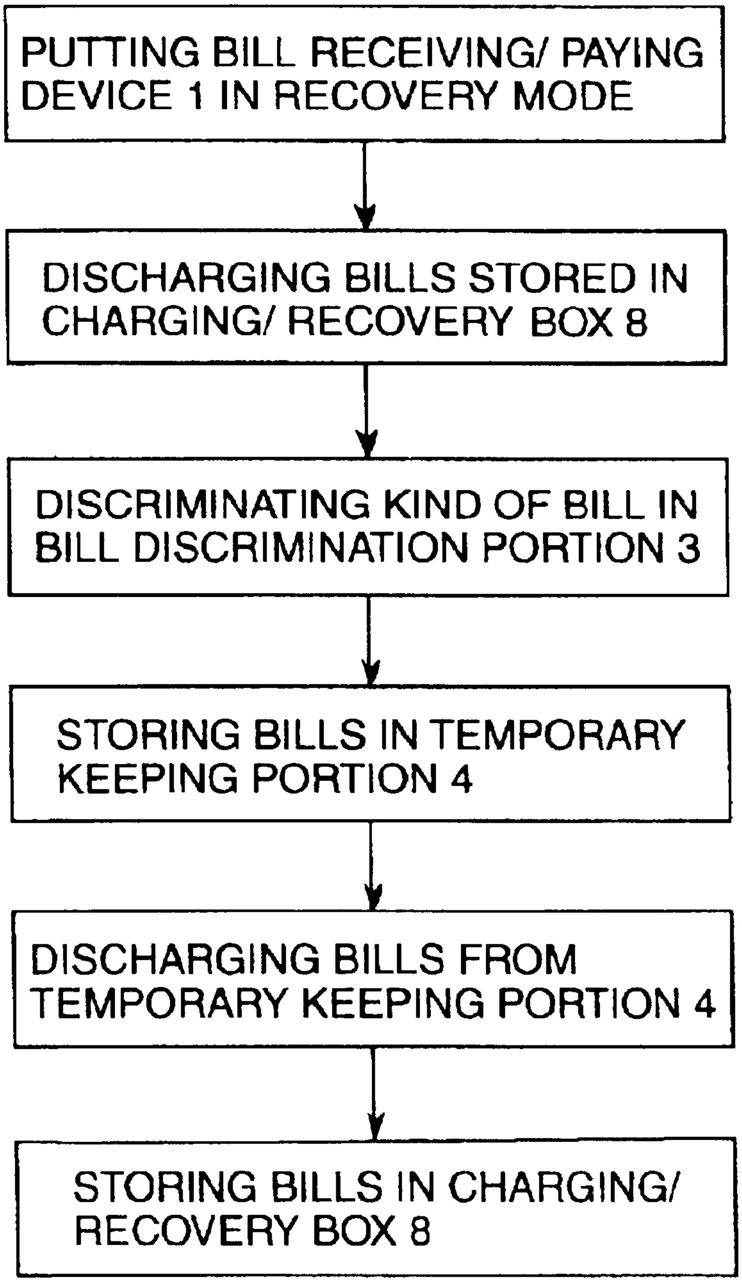
FIG. 10 is a view showing a flowchart of the embodiment when withdrawing bills.

Subsequently, the bills kept in the temporary keeping portion 4 are conveyed in a direction indicated by arrows as shown in FIG. 9 and discriminated by the bill discrimination portion 3 with respect to states of the bills to be stored in the charging/recovery box 8. In this embodiment, in the case of withdrawing the rejected bills stored in the receipt box 6, the bills are not stored in the charging/recovery box 8 but the receipt box 6 is dismounted and withdrawn as it is. FIG. 10 shows a flowchart of the above recovery of the bills.

Figure 11:
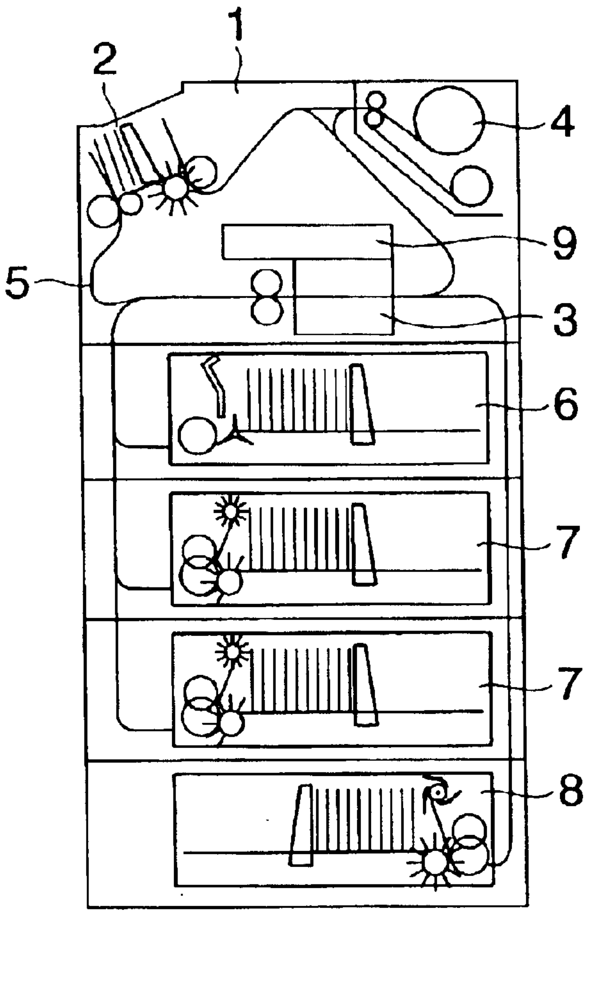
FIG. 11 is a view showing a second configuration of the bill receiving/paying device.

FIG. 11 is a view showing a second configuration of the bill receiving/paying device 1 mounted in the automated cash transaction apparatus 101. The bill receiving/paying device is different from that shown in FIG. 3 with respect to a configuration of a conveyance path 5, so that the conveyance path connected to the charging/recovery box 8 is disposed on an opposite side with the receipt box 6, the storage/discharge boxes 7 and the bill discrimination portion 3. More specifically, a path connecting the charging/recovery box 8 and the bill discrimination portion 3 is configured so as to be separated from a path connecting the storage/discharge boxes 7 and the bill discrimination portion 3. By configuring the conveyance path 5 so that the paths do not overlap each other and arranging the bill discrimination portion 3 on the path connecting the charging/recovery box 8 and the storage/discharge boxes 7, it becomes possible to continuously carry out the charging/recovery of the bills without passing through the temporary keeping portion 4.

Charging of bills in the second configuration will be described below with reference to FIGS. 12 and 13.

Figures 12, 13:
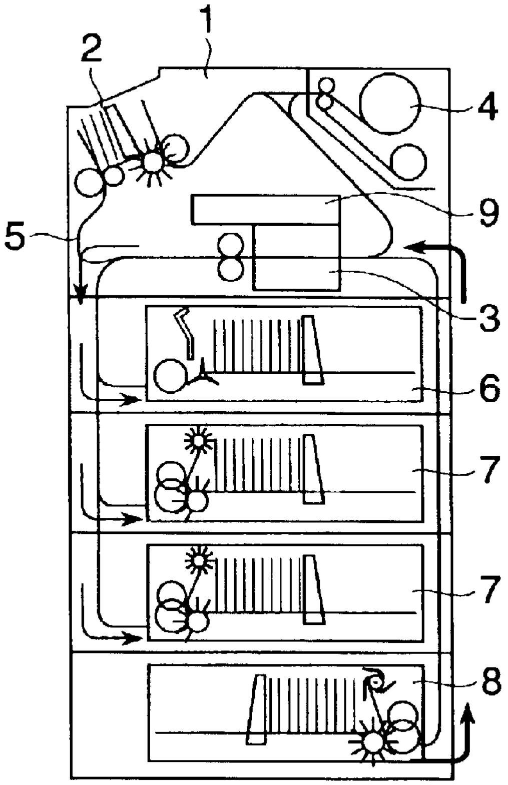
FIG. 12 is a view showing operation of the second configuration when charging bills.
FIG. 13 is a view showing a flowchart of the second configuration when charging bills.

FIG. 12 is a view showing operation when charging bills, and FIG. 13 is a flowchart thereof. The bills discharged from the charging/recovery box 8 go thorough the bill discrimination portion 3 and discriminated thereby with respect to the kinds and the states thereof so that the kinds and the number of the bills are decided. The bills are stored in the receipt box 6 and the storage/discharge boxes 7 in accordance with results of the above discrimination.

Subsequently, recovery of the bills in the second configuration will be described below with reference to FIGS. 14 and 15.

Figure 14:
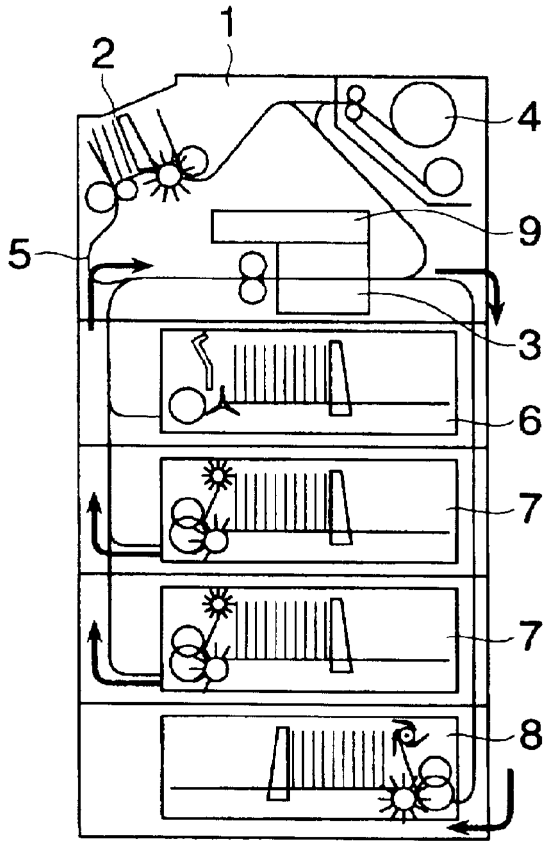
FIG. 14 is a view showing operation of the second configuration when withdrawing bills.
Figure 15:
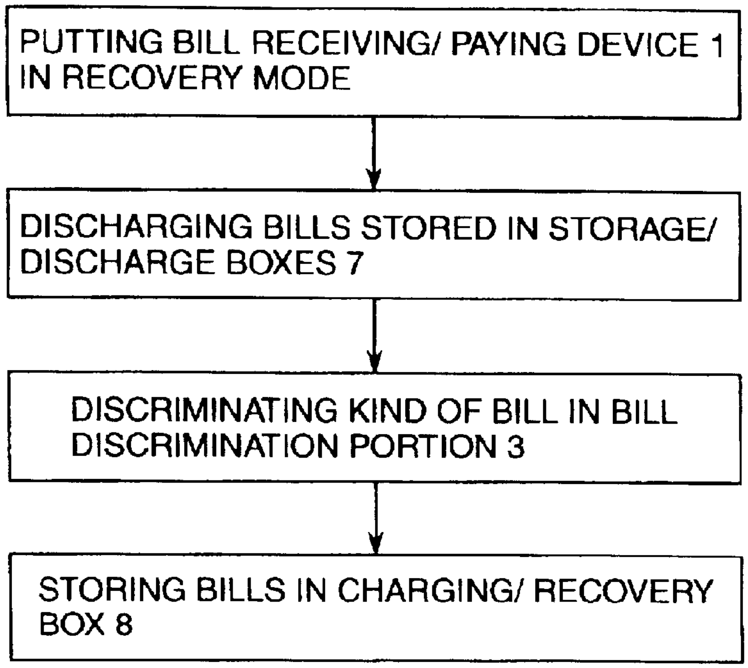
FIG. 15 is a view showing a flowchart of the second configuration when withdrawing bills.

FIG. 14 is a view showing operation when collecting bills, and FIG. 15 is flowchart thereof. The bills discharged from the storage/discharge boxes 7 go through the bill discrimination portion and discriminated thereby with respect to the kinds and the states thereof so that the kinds and the number of the bills are decided. Then, the bills are stored in the charging/recovery box 8. The charging/recovery box 8 is dismounted from the bill receiving/paying device 1 and recovered by an operator.

Also, in order to perform detailed checking during operation of the automated cash transaction apparatus 101, the collecting operation and the charging operation can be made to decide the number of the bills within the apparatus.

Subsequently, the charging/recovery box 8 in the embodiment will be described in detail.

When charging or recovering bills, it is necessary to intermix plural kinds of bills in one bill storage/discharge box. In the case that the sizes of bills are considerably different every kind, there is a need for a charging/recovery box capable of storing the bills of different sizes in an intermixed state.

Figure 16:
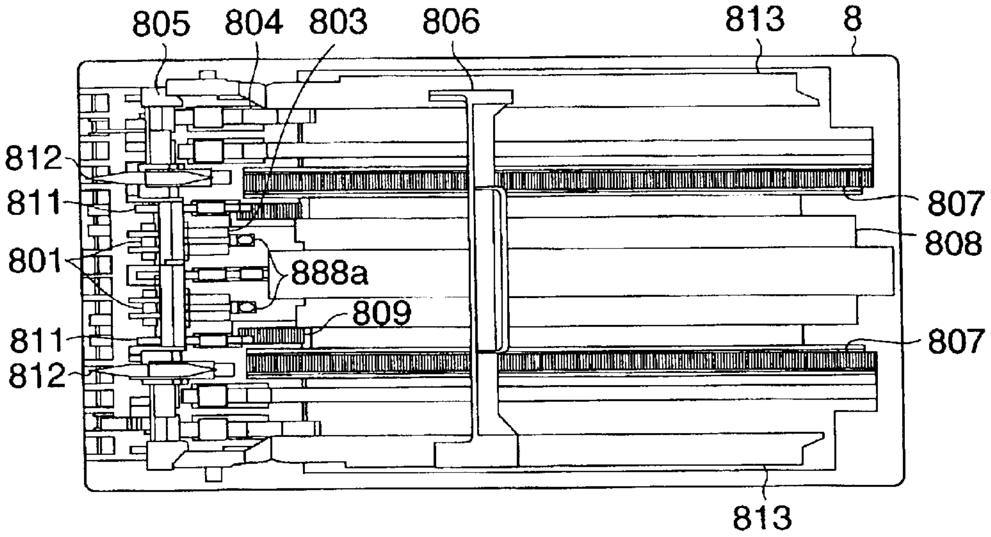
FIG. 16 is a top plan view showing a charging/recovery box loaded on the bill receiving/paying device.
Figure 17:
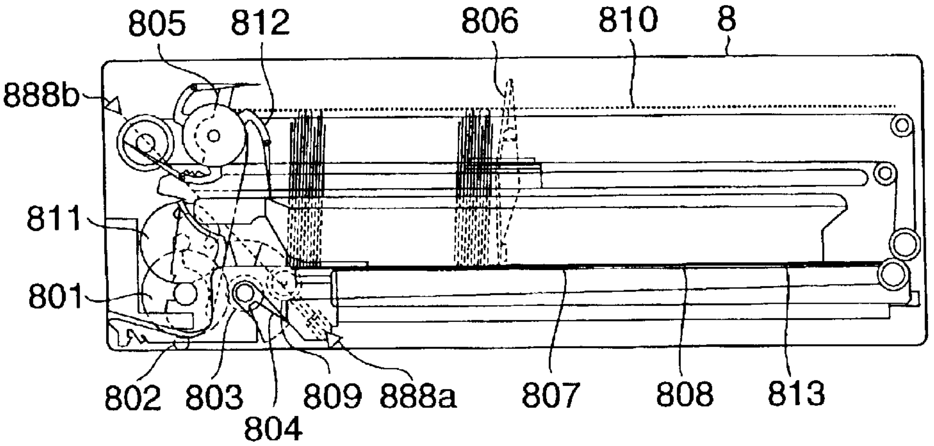
FIG. 17 is a side view showing a state where bills are stored in the charging/recovery box.
Figure 18:
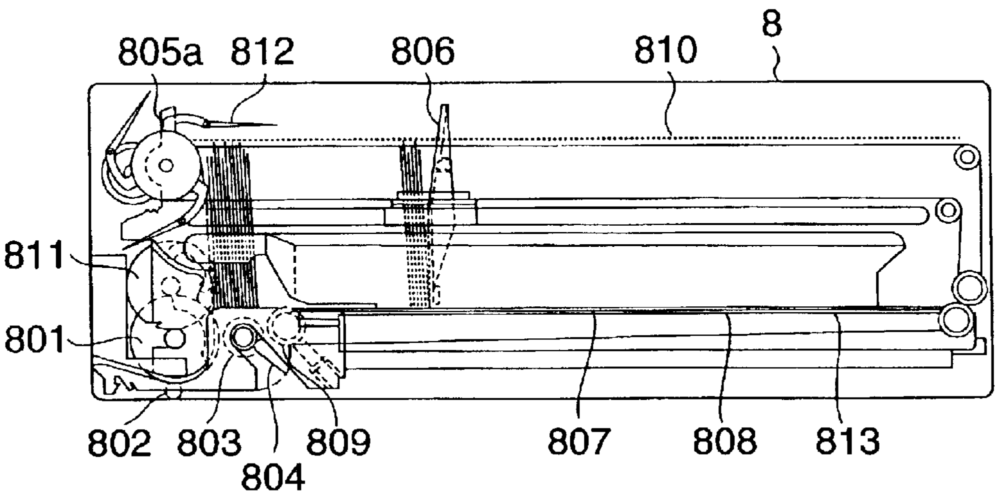
FIG. 18 is a side view showing a state where bills are discharged from the charging/recovery box.

FIG. 16 is a top plan view showing a configuration of a charging/recovery box 8 mounted in the bill receiving/paying device 1. Also, FIG. 17 is a side view showing a state where bills are stored in the charging/recovery box 8, and FIG. 18 is a side view showing a state where the bills are discharged from the charging/recovery box 8. The charging/recovery box 8 is of a horizontal-type in which the bills are stored in an upright position so as to be arranged in a horizontal direction, and is capable of storage and separate paying-out.

A bill taking-in/discharge mechanism includes stacking/feed rollers 801, pickup rollers 811, driven rotation backup rollers 802, gate rollers 803 which rotate in a bill storing direction but do not rotate in a paying-out direction, brush rollers 804 which are disposed coaxial with the gate rollers 803 and on which flexible pushing members are arranged radially, and separation/stacking guides 805 adapted to change its position in accordance with the operation, separation or stacking.

The stacking/feed rollers 801 are driven by a drive source (not shown) through gears to rotate. A bill to be stored is fed to a taking-in space, and a bill to be discharged is fed to the conveyance path 5. The backup roller 802 is driven by the stacking/feed roller 801 and rotates to interpose a bill with the stacking/feed roller 801 so as to convey the bill. The gate roller 803 is driven by the stacking/feed roller 801 to rotate when storing the bill, but does not rotate when discharging the bill. More specifically, when separating a bill from other bills and feeding out it by means of the pickup roller 811 and the stacking/feed roller 801, a bill adjacent to the bill to be discharged comes into contact with the gate roller 803 so as to be prevented from following the discharged bill.

The stacking/feed roller 801 and the gate roller 803 define a taking-in/discharge port to the taking-in space. More specifically, when a bill is released from an interposed state between the stacking/feed roller 801 and the gate roller 803 at the time of storage, the bill is put in a non-constraint state except contact with the separation/stacking guide 805 and then, taken into the taking-in space.

In addition, the brush rollers 804 have a sheet only over an approximately half of its circumference in order to materialize bill discharging operation. When storing a bill, the brush roller rotates in a bill storage direction, whereby bills stacked in the taking-in space are scraped out into the storage space by means of the radially arranged sheet. When discharging bills, the brush roller 804 rotates to a position in which the sheet escapes from the taking-in space. Accordingly, a bill to be discharged will not interfere with the sheet at the time of discharging the bill.

Also, the pickup rollers 811 are driven in synchronism with the stacking/feed rollers 801, and the brush rollers 804 are driven in reverse rotation to the stacking/feed rollers 801, whereby it is contemplated to make a drive source for common use. In addition, the brush rollers 804 are coupled with the stacking/feed rollers 801 through an one-way clutch, and do not rotate at the time of bill discharge. In addition, the one-way clutch rotates in one direction but not in an opposite direction, such that it rotates in a clockwise direction shown in FIG. 17 but not in a counterclockwise direction.

The separation/stacking guides 805 have taking-in space sides thereof serving as bill guide surfaces, which guide a surface of a bill at the time of storage and discharge of a bill. At the time of storing the bill, the bill guide surfaces are arranged in a position along an elongation in a bill moving direction in the taking-in/discharge port of the bill taking-in/discharge mechanism. At the time of discharging the bill, the bill guide surfaces escape to a position in which bills can be separated one by one by means of the pickup rollers 811.

The storage spaces are surrounded and defined by a bottom plate 808, bottom surface belts 807 disposed above the bottom plate 808 and suspended in a manner to support lower ends of the bills stored, a push plate 806, the separation/stacking guides 805, a roof plate 810, and side walls 813.

Mount positions of the side walls 813 can be set conformed to sizes of the bills. It is appropriate to set a width of the side walls 813 to a value greater by around 2 mm to 10 mm than widthwise sizes of the bills. Also, a distance between the bottom plate 808 and the roof plate 810 is set at a value greater than a heightwise length of a bill having a maximum size so that the maximum size bill dealt by the bill receiving/paying device 1 can be stored.

Since the charging/recovery box 8 must handle the bills of different sizes, it is provided with a stacking assist means near the taking-in/discharge mechanism. The control portion 9 controls the stacking assist means on the basis of information with respect to the sizes of the bills stored.

In the embodiment, there are stacking assist members 812 for guiding leading ends of the bills stored above the separation/stacking guides 805 in a moving direction.

Figure 19:
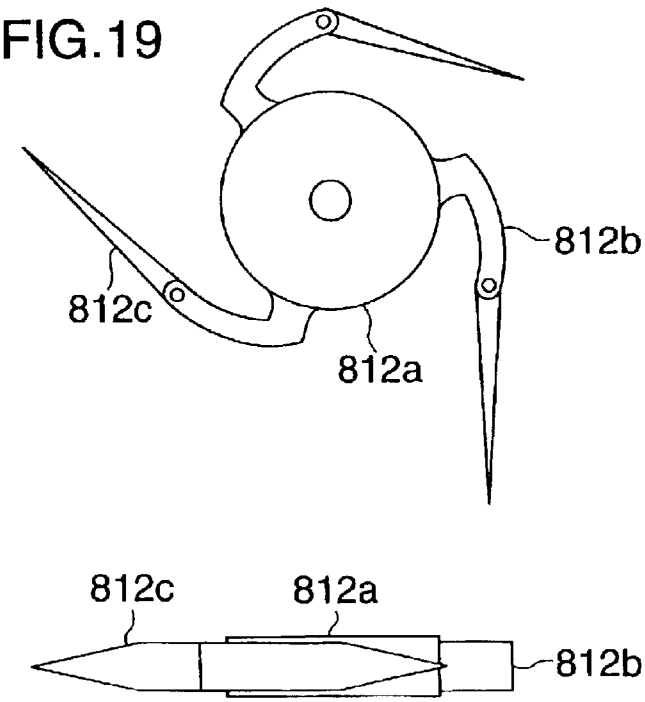
FIG. 19 is a view showing a shape of a stacking assist member.

FIG. 19 shows a shape of the stacking assist member 812. The stacking assist members 812 include a roller portion 812*a* having an axis of rotation along an edge line of a leading end of a bill in the moving direction, L-shaped vane portions 812*b*, and movable tip end portions 812*c* connected to tip ends of the vane portions 812*b* which tip end portions 812*c* can turn a predetermined angle, the stacking assist members being controlled in rotation by the control portion 9.

The stacking assist members 812 are mounted such that an outer peripheral surface of the roller portion 812*a* is positioned at an extension of the bill guide surface of the separation/stacking guide 805.

Here, an explanation will be given to the L-shaped vane portions 812*b* and the movable tip end portions 812*c*. The vane portions 812*b* protruding from the roller portion 812*a* are shaped such that, when the vane portion 812*b* is positioned on a side toward the storage space, that is, one of the three vane portions 812*b* shown in FIG. 17 is positioned on the side (righthand side in the figure) toward the storage space, a tip end of the vane portion 812*b* is curved toward the taking-in/discharge mechanism. A taking-in space is defined by the inner surface of the vane portion 812*b* which surface extends from a bent portion of the vane portion 812*b* to a tip end thereof and faces the outer peripheral surface of the roller portion 812*a*, and the outer peripheral surface of the roller portion 812*a*, so that a leading end of the bill stored through the taking-in/discharge mechanism is guided to the taking-in space.

An inner surface on a side of the taking-in space from the roller portion 812*a* to the bent portion of the vane portion 812*b* serves as a bill end stopper portion to form an inner end surface of the taking-in space, which restrains excessive running of an end of a bill to be stored thorough the taking-in/discharge mechanism.

The movable tip end portions 812*c* are connected to tip ends of the vane portions 812*b* so as to be able to turn a predetermined angle. A boundary between the taking-in space and the storage space is defined by a region, which extends from the bent portion of the vane portion 812*b* to a tip end of the movable tip end portion 812*c*. The movable tip end portions 812*c* and the separation/stacking guide 805 ensure a space therebetween, so that bills stored are guided to the space, that is, the taking-in space.

A distance between the tip end of the movable tip end portion 812*c* and the bottom plate 808 is made smaller than a length of minimum size bills dealt by the bill receiving/paying device 1 in the moving direction, that is, a height of minimum size bills stored in an upright position, and a distance from the taking-in port thereto is preferably made smaller than a length of minimum size bills in the moving direction. With such arrangement, bills taken into the taking-in space in an upright position can be prevented from falling down within the taking-in space, so that stable storage is made possible. Further, the bills stored in the storage space can be prevented from falling down into the taking-in space, and so it is possible to prevent interference between the bills being taken in and the bills stored.

The stacking assist members 812 are controlled in rotation so that bills having been taken into the taking-in space are maintained in an upright position. When a bill of large size is taken in, the member is controlled at a turning angle such that a distance from the taking-in/discharge port to the bill end stopper portion is made a length conformed to a bill of large size, and when a bill of small size is taken in, the member is controlled at a turning angle such that a distance from the taking-in/discharge port to the bill end stopper portion is made a length conformed to a bill of small size.

Here, the distance corresponding to a length conformed to a bill size indicates a distance somewhat longer than a length of a bill size in the moving direction. The reason for the somewhat longer distance is that a bill being taken in is in some cases fed obliquely to the taking-in space depending upon the state of conveyance. At this time, when a distance from the taking-in/discharge port to the bill end stopper portion is equal to a length of a bill size in the moving direction, it is feared that a leading end of the bill collides against the bill end stopper portion to buckle. In order to prevent such buckling, a margin is provided on the taking-in space under the above control.

The stacking assist members 812 are provided in plural in a widthwise direction of bills as shown in FIG. 16 to guide upper ends of the bills being stored into the taking-in spaces in a plurality of locations. Accordingly, even if the bills tend to be folded and curled, those can be stably stored without causing interference with succeeding bills.

A transmission sensor includes a light emitting element 888*a* and a photodetector 888*b*. When a bill is present in the vicinity of the taking-in/discharge port, light is intercepted by the bill and so the sensor detects the presence of the bill in the vicinity of the taking-in/discharge port. When a period of time, during which light is intercepted, is prolonged at the time of storage, the push plate 806 is driven to widen a space for storage of the bills.

By controlling those in this manner, the stacking assist members 812 are positioned in a manner to provide for partitions between the taking-in spaces and the storage portions when a bill or bills are taken into the charging/recovery box 8. Also, when a bill or bills having been taken into the taking-in spaces are transferred to the storage portions, the stacking assist members move in a manner to allow the bill or bills to be transferred to the storage portions.

Also, the bill end stopper portions of the stacking assist members 812 are displaced in accordance with sizes of the bills being taken into the taking-in spaces, to enable bills of different sizes to be stored.

That is, the stacking assist members 812 may include a partitioning member which is positioned in a manner to provide for a partition between the taking-in space and the storage portion in the charging/recovery box 8 when a bill is taken into the charging/recovery box 8 and which moves in a manner to allow a bill to be transferred to the storage portion when the bill having been taken into the taking-in space is transferred to the storage portion, and a restraint member which is displaced in accordance with a size of the bill.

However, the stacking assist member 812 can be controlled as one body by providing a partitioning member and a restricting member integrally, a unit as shown in the embodiment.

As shown in FIG. 18, when a bill or bills are discharged from the charging/recovery box 8, the separation/stacking guide 805 and the stacking assist members 812 escape away from the storage portions unlike the case where the bill or bills are taken therein. The stored bills are pushed toward the separation/stacking guides 805 by the push plate 806, and separated one by one by rotation of the pickup rollers 811 to go thorough the taking-in/discharge mechanism to be discharged from the charging/recovery box 8.

Subsequently, operation in the case of storing a bill or bills in the charging/recovery box 8 will be described with reference to FIGS. 20 to 23. The case of charging the charging/recovery box 8 with bills is, for example, the case of withdrawing bills in the apparatus, at which the control portion 9 controls the bill receiving/paying device 1 so as to put the same in the recovery mode.

In addition, since there is a need of detecting sizes of the bills stored in the charging/recovery box 8, there is provided a bill size detecting means. The bill size detecting means of the embodiment includes the bill discrimination portion 3 and the storage portion DB to detect sizes of the bills. Since the kinds of the bills passing through the bill discrimination portion 3 are discriminated from one another, by providing database in which the kinds and the sizes of the bills are associated with each other, it becomes possible to recognize the sizes of the bills being conveyed. The control portion 9 performs the following control on the basis of a size of the bill detected by the bill size detecting means. Hereinafter, explanations will be given separately to the case of storing a large-sized bill and the case of storing a small-sized bill.

Figure 20A:
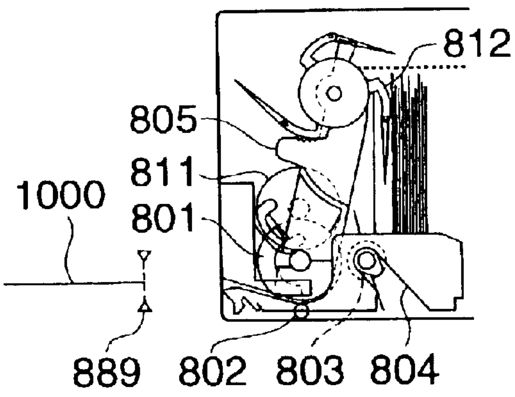
FIGS. 20A to 20D are views showing operation when storing a bill in the charging/recovery box.
Figure 20B:
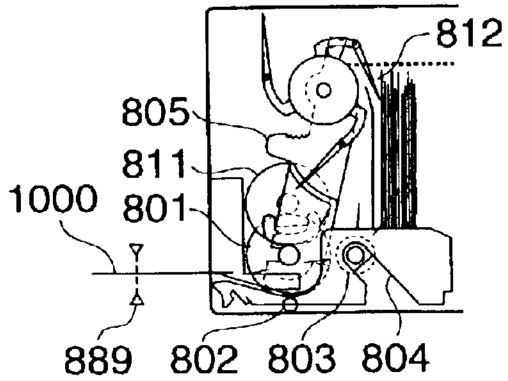

FIGS. 20A to 20D are views showing operation in the case of storing a large-sized bill. Passage of a bill 1000 to be stored in the charging/recovery box 8 is detected by a bill passage sensor 889 (FIG. 20A). The bill 1000 enters the charging/recovery box 8 through the taking-in/discharge mechanism (FIG. 20B).

Figure 20C:
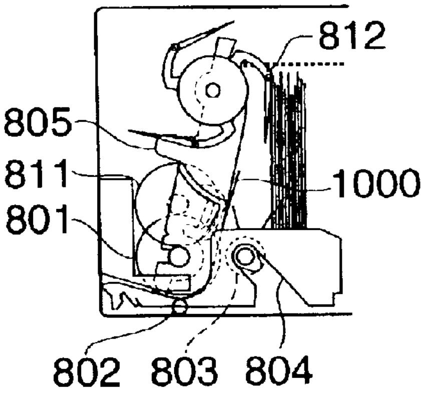
Figure 23:
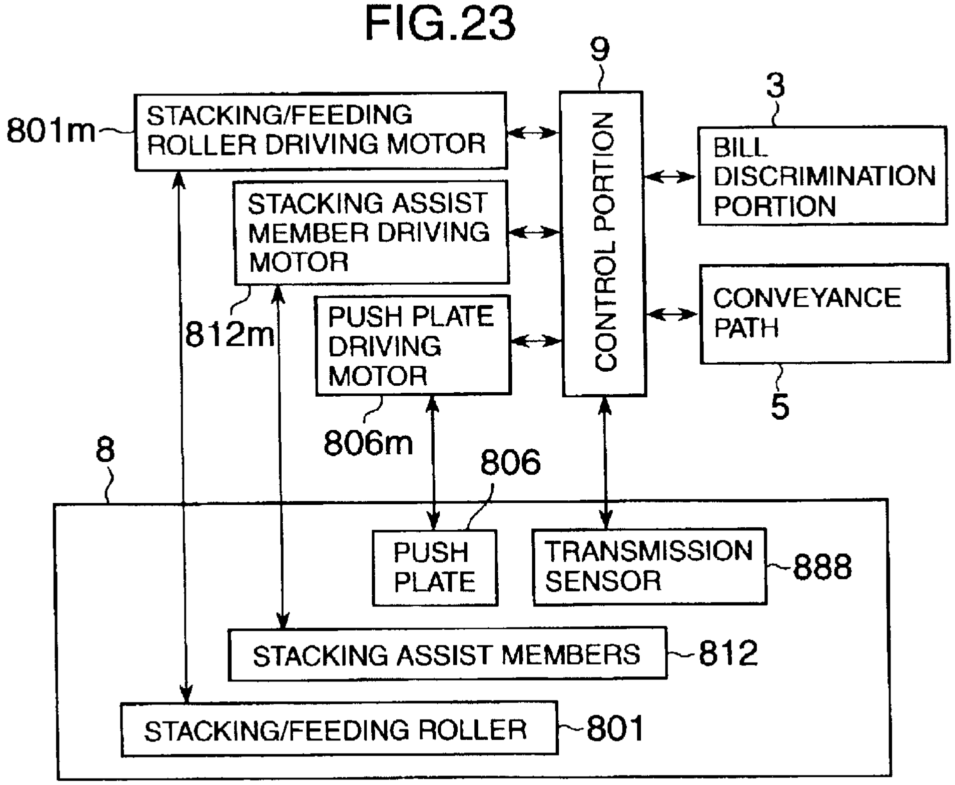
FIG. 23 is a view showing a control mechanism for storing and discharging bills from the charging/recovery box.

Meanwhile, as shown in FIG. 23, when the control portion 9 puts the bill receiving/paying device 1 in the recovery mode, it controls the charging/recovery box 8 in a manner to put the same in the storage mode. In the storage mode, a stacking/feed roller driving motor 801*m* is driven to further convey the bill having entered the taking-in/discharge mechanism. When passage of the bill 1000 is detected by a bill passage sensor 889, the control portion 9 controls a stacking assist member driving motor 812*m* so that the stacking assist members 812 rotate up to positions where they wait for the large-sized bills (FIG. 20C).

Further, the bill 1000 is fed into the charging/recovery box 8 and caused by the stacking/feed roller 801 and the gate roller 803 to enter the taking-in space. At this time, the bill 1000 is fed while being maintained in an upright position along the bill guide surface of the separation/stacking guide 805. The separation/stacking guide 805 has the bill guide surface arranged along a moving direction of a bill entering from the taking-in/discharge port, so that the bill 1000 fed by the stacking/feed roller 801 and the gate roller 803 is guided along the bill guide surface of the separation/stacking guide 805.

Figure 20D:
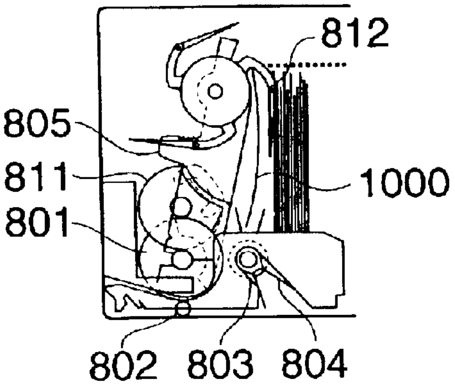

After a leading end of the bill 1000 in its moving direction enters the taking-in space of the stacking assist member 812 and the bill is released from a state in which the bill is interposed between the stacking/feed roller 801 and the gate roller 803, the leading end of the bill 1000 in the moving direction comes into contact with the bill end stopper portion on the inner end surface of the stacking assist member 812. That is, the leading end of the bill 1000 is restrained to prevent the bill from moving excessively and a trailing end of the bill in the moving direction is brought into contact with the bottom plate 808, so that the bill is stacked in an upright position (FIG. 20D). The bills stacked in the taking-in space are fed toward the storage space by pushing upper and lower ends thereof by means of the brush roller 804 and the stacking assist member 812. When the stored bills increase in quantity and a period of time during which light is intercepted in the transmission sensor 888 is prolonged, the control portion 9 controls a push plate driving motor 806*m* to move the push plate 806 so as to widen the storage space, thereby ensuring the storage space.

Subsequently, an explanation will be given to the case of storing a small-sized bill. Firstly, disadvantages involved in the prior art in the case of storing a small-sized bill will be described. The charging/recovery box 8 is set such that a distance between the bottom plate 808 and the roof plate 810 is conformed to a large-sized bill so as to enable also storing a large-sized bill.

In some cases, when folded or curled bills are stored, the bills cannot be stored in a state in which lower ends thereof are true up on the bottom plate 808. That is, since a bill having such tendency to be folded or curled has a width in a direction of storage within the charging/recovery box 8, it is feared that such bill is interposed between previously stored bills and the separation/stacking guide in the taking-in space to stop the operation.

In the case where the bills are not stored in a state in which lower ends thereof are true up on the bottom plate 808, a disadvantage is caused when the bill receiving/paying device 1 is in the charging mode. More specifically, since the bills are separated one by one from other bills by means of the pickup rollers 811 arranged in the vicinity of the taking-in/discharge port when the bills are discharged from the charging/recovery box 8, the pickup rollers 811 find difficulty in separation of bills in the case where ends of the bills are not true up on a side of the taking-in/discharge port.

Meanwhile, it is required that the pickup rollers 811 are arranged in the vicinity of the taking-in/discharge port. If the pickup rollers 811 were arranged away from the taking-in/discharge port, a distance between a position, in which the bill is given a conveyance force by the pickup roller 811, and the taking-in/discharge port would be increased to cause a disadvantage that it becomes difficult to guide ends of the bills to the taking-in/discharge port.

Also, in the case where bills must be stored in an upright position, the following problem is involved in addition to the above disadvantage. In order to maintain the bills so as to be stored in an upright position, it is necessary to support upper ends of the bills. However, since the upper ends are varied in position when the bills are different in size, it is necessary to provide support members conformed to sizes of the bills.

Hereupon, the small-sized bills are stored in the following manner.

Figure 21A:
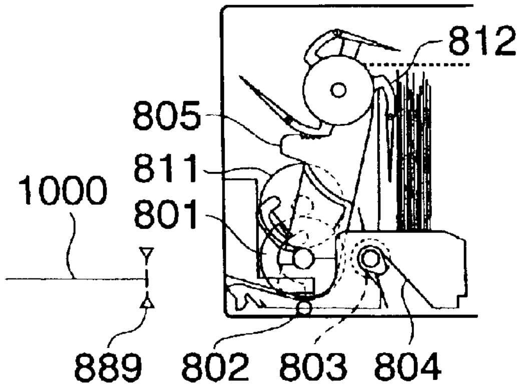
FIGS. 21A to 21D are views showing operation when storing a bill in the charging/recovery box.
Figure 21B:
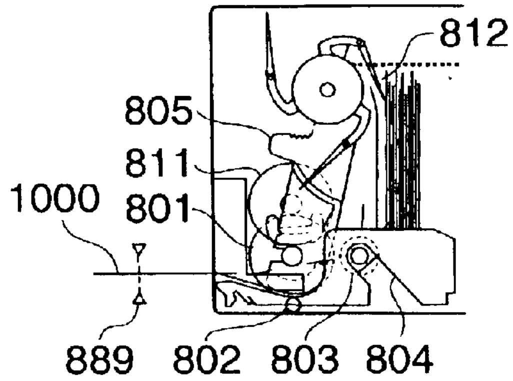

FIGS. 21A to 21D are views showing operation in the case of storing a small-sized bill. Passage of a bill 1000 to be stored in the charging/recovery box 8 is detected by the bill passage sensor 889 (FIG. 21A). The bill 1000 enters the charging/recovery box 8 through the taking-in/discharge mechanism (FIG. 21B).

Figure 21C:
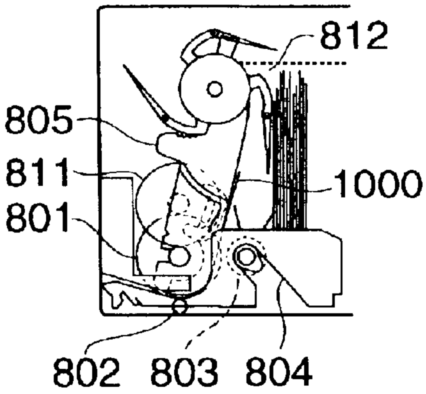

Meanwhile, when the control portion 9 puts the bill receiving/paying device 1 in the recovery mode, it controls the charging/recovery box 8 in a manner to put the same in the storage mode. In the storage mode, the stacking/feed roller driving motor 801*m* is operated to further convey the bill having entered the taking-in/discharge mechanism. When passage of the bill 1000 is detected by the bill passage sensor 889, the control portion 9 controls the stacking assist member driving motor 812*m* so that the stacking assist members 812 rotate up to positions where they wait for small-sized bills (FIG. 21C).

Further, the bill 1000 is fed into the charging/recovery box 8 and caused by the stacking/feed roller 801 and the gate roller 803 to enter the taking-in space. At this time, the bill 1000 is fed while being maintained in an upright position along the bill guide surface of the separation/stacking guide 805. The separation/stacking guide 805 has the bill guide surface, which is arranged along a moving direction of a bill entering from the taking-in/discharge port, so that the bill 1000 having been fed by the stacking/feed roller 801 and the gate roller 803 is guided along the separation/stacking guide 805.

Figure 21D:
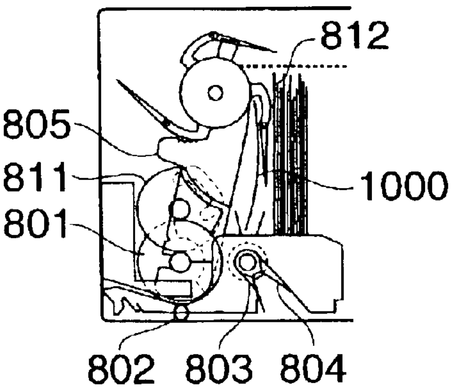

After a leading end of the bill 1000 fed in the moving direction enters the taking-in space of the stacking assist member 812 and the bill is released from a state in which it is interposed between the stacking/feed roller 801 and the gate roller 803, the leading end of the bill 1000 in the moving direction comes into contact with the bill end stopper portion on the inner end surface of the stacking assist member 812. That is, the leading end of the bill 1000 is restrained to prevent the bill from moving excessively and a trailing end of the bill in the moving direction is brought into contact with the bottom plate 808, so that the bill is stacked in an upright position (FIG. 21D). The bills stacked in the taking-in space are fed toward the storage space by virtue of upper and lower ends thereof being pushed by the brush roller 804 and the stacking assist member 812. When the stored bills are increased in quantity and a period of time during which light to be received by the transmission sensor 888 is intercepted is prolonged, the control portion 9 controls the push plate driving motor 806*m* to move the push plate 806 so as to widen the storage space, thereby ensuring the storage space.

In the above example, the stacking assist member 812 restrains a leading end of the bill being stored so as to enable preventing the bill from running excessively, so that even in the case of storing small-sized bills, the bills can be stored while trailing ends of the bills in the moving direction are true up on the bottom plate 808.

Accordingly, the bills can be separated one by one from one another even in the case where the bills are discharged from the charging/recovery box 8, and thus stable discharging operation is made possible. Also, since a distance between the movable tip end portion 812*c* and the bottom plate 808 is set to be made smaller than a size of minimum size bills dealt by the apparatus, interference between the bills being taken in the taking-in space and the bills stored in the storage space can be prevented.

Figure 22:
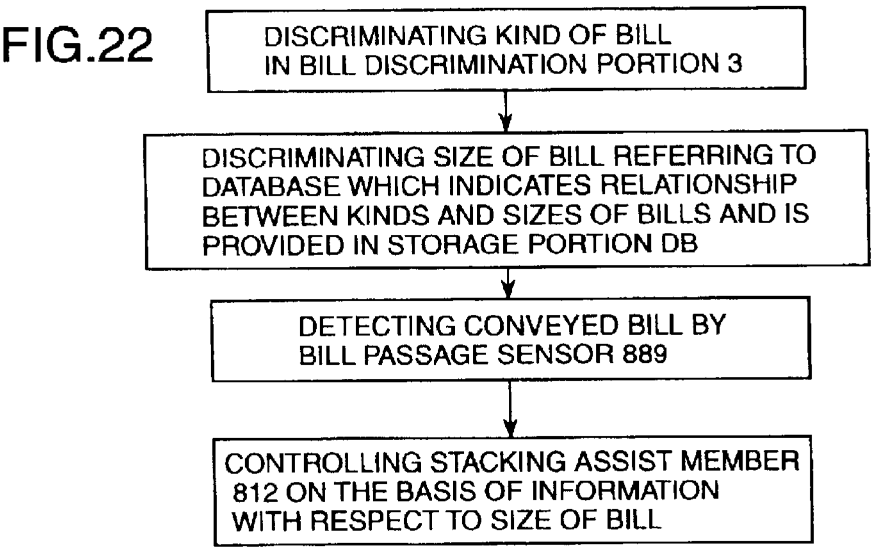
FIG. 22 is a flowchart when storing a bill in the charging/recovery box.

FIG. 22 is a flowchart showing the operation of storage in the embodiment. When a bill, of which kind and size are discriminated by the bill discrimination portion 3, is detected by the bill passage sensor 889, the control portion 9 controls the stacking assist member 812 on the basis of information with respect to the discriminated size of the bill.

Figure 24:
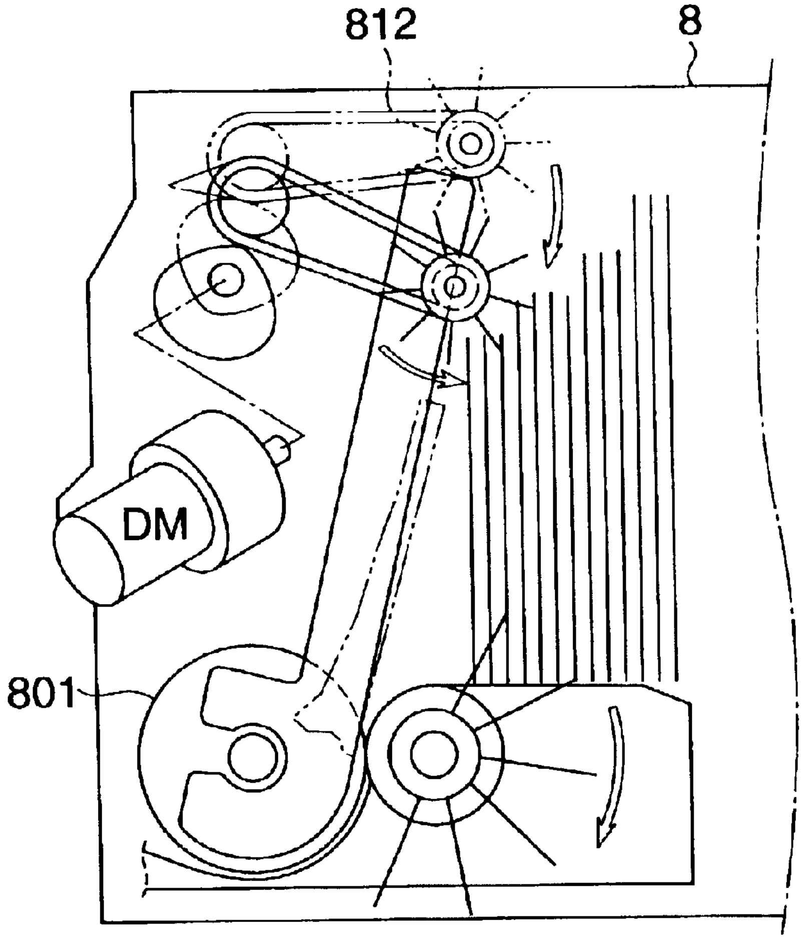
FIG. 24 is a view showing another embodiment of a stacking assist means.

FIG. 24 is a view showing another example of a stacking assist means mounted in the charging/recovery box 8. In this example, the control portion 9 controls a drive source DM to change a position of a stacking assist member 812 in a bill moving direction in accordance with a size of the bill. Also, a roller portion having a brush is continuously rotated in a counterclockwise direction in the figure to feed bills taken in toward a storage space.

While there has been shown, in the embodiment, a bill receiving/paying device using a receipt box for storing rejected bills and storage/discharge boxes as bill storage units by kinds, the charging/recovery box in the embodiment can be also used as a receipt box and a storage/discharge box. Since charging, recovering and detailed checking can be made together by the provision of at least one charging/recovery box, all bill storage units may be charging/recovery boxes.

Also, while an explanation has been given to the horizontal-type bill storage units, in which bills are stored in an upright position, the invention can be applied to vertical-type bill storage units, in which bills are stacked in a horizontal position. More specifically, even in the case where bills entering the bill storage units are conveyed in a horizontal direction, stacking in a lined-up state can be made by the provision of stacking assist means for restraining excessive moving.

In the case of storage in an upright position, however, bottom surfaces of the storage space and the taking-in space in the bill storage units serve as a guide by virtue of gravity, so that lower ends of bills stored are true up on the bottom surfaces. Therefore, ends of the bills in the direction of bill discharge are aligned together to facilitate discharge of the bills.

In this manner, it is possible, according to the embodiment, to store bills of different sizes in one charging/recovery box in an intermixed state. Also, it is possible to make charging, recovery and detailed checking together, in a bill receiving/paying device for dealing bills of different sizes.

As described above, it is possible, according to the invention, to provide a bill receiving/paying device and an automated cash transaction apparatus, in which bills of different sizes can be dealt, and charging and recovery can be made together.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A bill receiving/paying device comprising:

a bill storage unit for storing and discharging a bill;

a bill size detecting means for detecting a size of the bill to be stored in the bill storage unit;

a bill passage sensor for detecting passage of the bill to be conveyed to the bill storage unit;

a stacking assist means provided in the bill storage unit to restrain the bill entering into the bill storage unit from excessively moving therein; and a control portion for controlling the stacking assist means based on the bill size information detected by the bill size detecting means, after the passage of the bill is detected by the bill passage sensor;

wherein the bill storage unit stores the bill so as to be in an upright posture.

2. The bill receiving/paying device according to claim 1, wherein the bill size detecting means comprises a bill discriminating portion for discriminating a kind of the bill, and a storage portion having a database in which kinds of bills and sizes of bills are associated with each other.

3. The bill receiving/paying device according to claim 1, wherein the control portion controls, when discharging the bill, the stacking assist means so as to move to a position in which the stacking assist means does not interfere with the bill to be discharged.

4. The bill receiving/paying device according to claim 1, comprising the plurality of bill storage unit, wherein the bill storage units are charging/recovery boxes for withdrawing at least one bill from other bill storage units and charging the other bill storage units with the at least one bill.

5. The bill receiving/paying device according to claim 4, wherein the bill storage units comprises a receipt box for storing at least one bill being inadequate for payment, storage/discharge boxes for storing and discharging bills by kinds, and a charging/recovery box for withdrawing the at least one bill from the storage/discharge boxes and charging the storage/discharge boxes with the at least one bill, and the bill receiving/paying device further comprises a bill discrimination portion for discriminating the kind of the bill, and a conveyance path for conveying the at least one bill, by which the respective bill storage units and the bill discrimination portion are connected to each other, wherein the conveyance path is provided with the bill discrimination portion on its path portion connecting the charging/recovery box with the storage/discharge boxes.

6. The bill receiving/paying device according to claim 1, wherein the bill storage unit comprises a roller for feeding at least one bill which roller constitutes a receiving/paying opening, and a stacking guide having a bill guide surface for guiding the at least one bill fed by the roller to the bill storage unit toward a moving direction, wherein the stacking assist means comprises a stacking assist member which has a bill end stopper portion for restraining a leading end in the moving direction of the at least one bill to be stored, and forms a taking-in space, and wherein the control portion controls a distance between the bill end stopper portion and the receiving/ paying opening.

7. The bill receiving/paying device according to claim 6, wherein the stacking assist member comprises a roller portion having a rotation axis along an edge line of the leading end of the at least one bill in the moving direction, and a vane portion protruding radially from the roller portion, wherein the vane portion has a tip end of a L-shaped configuration curved toward the receiving/paying opening.

8. The bill receiving/paying device according to claim 6, wherein the stacking assist member comprises a roller portion having a rotation axis along an edge line of the leading end of the at least one bill in the moving direction, a vane portion protruding radially from the roller portion, and a movable tip end portion connected to a tip end of the vane portion so as to be rotatable within a predetermined angle, wherein the vane portion has a tip end of a L-shaped configuration curved toward the receiving/paying opening.

9. The bill receiving/paying device according to claim 8, wherein the plurality of stacking assist members are provided in a direction along a rotation axis of the roller portion.

10. The bill receiving/paying device according to claim 1, wherein the bill storage unit which stores the bill so as to be in an upright posture enables stacking of a plurality of the bills of different sizes in a horizontal direction and in an upright posture, and wherein one end of the bills is supported by a lower support member of the bill storage unit.

11. The bill receiving/paying device according to claim 1, wherein the bill receiving/paying device forms a part of an automated cash transaction apparatus.

12. A bill receiving/paying device comprising:

a bill storage unit for storing bills so as to stack the bills in a horizontal direction and in an upright posture;

a conveying device for conveying the bills to the bill storage unit;

a partition member which partitions an interior of the bill storage unit into a taking-in space and a storage portion when taking in a bill conveyed by the conveying device into the bill storage unit, and moves so as to allow the bill to be conveyed when transferring the bill taken into the taking-in space to the storage portion; and a restraining member adapted to be displaced in accordance with a size of the bill to be taken in, to come into contact with a leading end of the bill to restrain the bill from moving when taking in the bill into the bill storage unit, wherein the storage portion enables bills of different sizes to be stored therein.

13. The bill receiving/paying device according to claim 12, wherein the partition member and the restraining member are formed integrally.

14. The bill receiving/paying device according to claim 12, wherein one end of the bills is supported by a lower support member of the bill storage unit.

15. The bill receiving/paying device according to claim 12, wherein the bill receiving/paying device forms a part of an automated cash transaction apparatus.

* * * * *